Feb. 23, 1943.  R. M. RHOADS  2,311,868
APPARATUS FOR CONTROLLING THE FLOW OF A FLUID
Filed Oct. 1, 1940  2 Sheets-Sheet 1
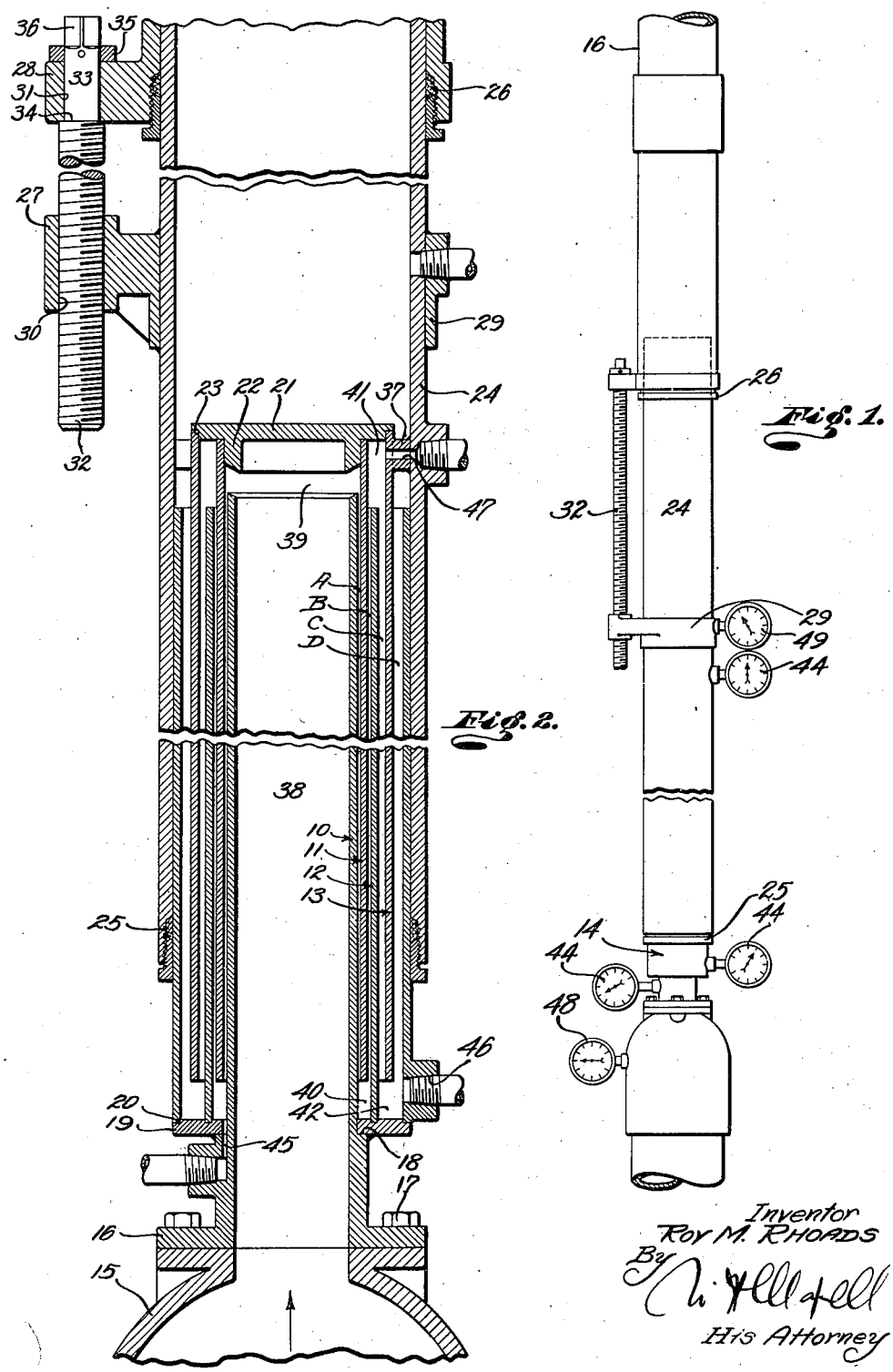

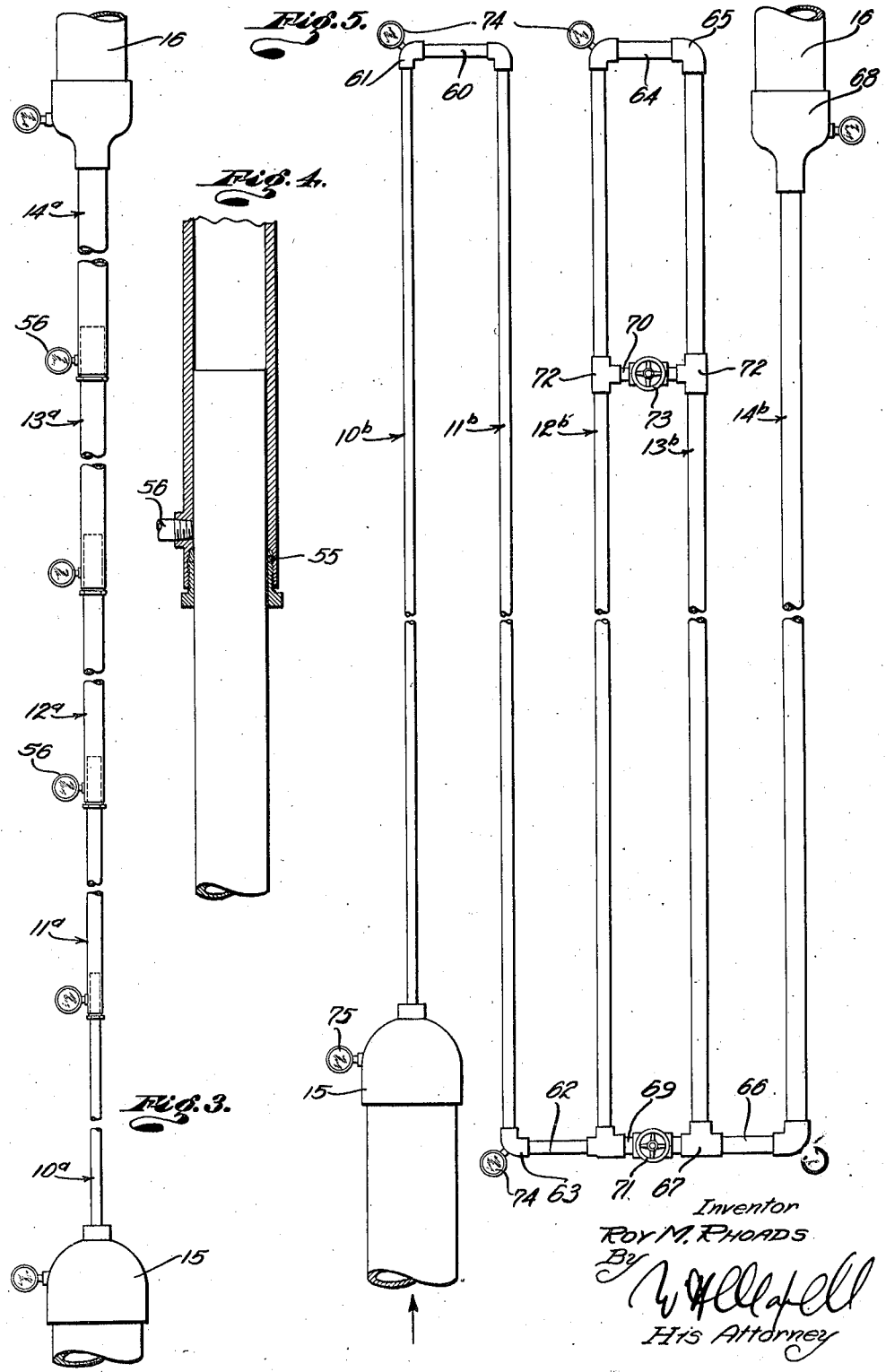

Patented Feb. 23, 1943

2,311,868

UNITED STATES PATENT OFFICE 2,311,868

APPARATUS FOR CONTROLLING THE FLOW OF FLUIDS

Roy M. Rhoads, Bellflower, Calif., assignor of one-fourth to Arthur L. Armentrout, one-fourth to Elwin B. Hall, and one-fourth to Virgil P. Baker, Los Angeles, Calif.

Application October 1, 1940, Serial No. 359,223

10 Claims. (Cl. 138—40)

This invention relates to the control of flowing fluid under pressure and has particular reference to methods and apparatus for controlling the flow from wells. A general object of this invention is to provide a practical, effective method and simple dependable and efficient apparatus for controlling the flow from oil or gas wells, and particularly wells which produce water and other non-petroleum substances with the oil or gas.

It is common practice to control flowing wells by means of chokes or flow beans incorporated in the Christmas tree at the head of the well or installed in the lower portion of the wall. The chokes or flow beans of the class employed to control the flow from wells usually embody an orifice of small diameter in the path of the well fluid for bringing about a marked reduction in the pressure. Such chokes or flow beans give considerable trouble, the abrasive solid matter particles in the well fluid quickly enlarging the orifices and necessitating frequent repairs and replacements.

I have discovered that a flow bean often emulsifies the oil and water of well fluid passing through it. The emulsions thus formed require special costly treatment to break them down. Tests have disclosed that the fluid within a well is often unemulsified but after its passage through the usual flow bean it is in the form of an emulsion that is difficult to break, the flow bean having acted to emulsify the oil and water produced therewith thus forming a mixture that is difficult to separate.

An important object of the present invention is to provide a method and apparatus for controlling the flow of fluid under pressure, and suited for use on an oil well, that effectively reduces the fluid pressure without emulsifying the fluid.

Another object of this invention is to provide a flow controlling apparatus of the character referred to that is long wearing and does not require the use of orifice plates, choke nipples and similar parts that are subject to rapid wear by the flow action or abrasive action of the fluid.

Another object of this invention is to provide a flow controlling apparatus that produces a substantial reduction in the fluid pressure without a rapid reduction in the temperature. This feature of the invention adapts the apparatus for the handling of mixed liquid and gas as produced by many wells, and for the handling of moisture-laden gas. When chokes, flow beans, and other devices having restricted orifices, are employed to reduce the pressure of moisture bearing gases the sudden reduction in temperature accompanying the reduction in pressure at the orifice often results in freezing the liquids in the line thereby choking off or seriously reducing the line capacity and necessitating a shut down. In the apparatus of the present invention there is no appreciable reduction in the temperature of the fluid and, therefore, no possibility that liquids will freeze in the line and cause the resultant difficulties.

Another object of this invention is to provide a flow controlling apparatus adapted to receive fluids at very high pressures and adapted to reduce the pressure to a point at which the fluid may be safely handled by the standard pipe lines, separators, etc.

Another object of this invention is to provide a flow controlling apparatus of the character mentioned that is easily regulated or adjusted to bring about the required reduction in pressure.

A further object of this invention is to provide a method for controlling the flow of fluids from wells which brings about a gradual pressure reduction without an extreme or sudden change in the velocity of the flowing fluid and without creating turbulence, which method is readily variable to reduce the pressure to the extent desired.

The various objects and features of my invention will be fully understood from the following detailed description of typical preferred manners of carrying out the method and typical forms of apparatus of the invention, throughout which description reference is made to the accompanying drawings, in which:

Fig. 1 is a side elevation of one form of apparatus of the invention. Fig. 2 is an enlarged, longitudinal, detailed sectional view of the apparatus illustrated in Fig. 1. Fig. 3 is a side elevation of another form of the apparatus. Fig. 4 is an enlarged longitudinal detailed sectional view of a portion of the apparatus shown in Fig. 3 with one of the flow sections or units appearing in side elevation, and Fig. 5 is a side elevation of another form of apparatus of the invention.

The embodiment of the invention illustrated in Figs. 1 and 2 of the drawings may be said to comprise, generally, a plurality of flow sections or flow units 10, 11, 12, 13 and 14, together forming a fluid conductor or carrier of gradually increasing fluid capacity for handling or conducting the fluid from the well.

The form of the invention illustrated in Figs. 1 and 2 of the drawings and the method of the invention practiced with this apparatus involve the employment of a plurality of flow sections or units 10 to 14, inclusive, nested or telescoped one within the other to occupy a minimum of space. The invention contemplates the formation and assembling of the units 10 to 14 in such a manner that the apparatus may be installed in the wall, for example connected in the oil string or production string adjacent the lower end of the same. In the particular application of the invention illustrated the assembly of the sections 10 to 14 is connected with a Christmas tree part or well head 15, being interposed between the part or head 15 and a pipe 16 for conducting the fluid from the well. It is to be understood that the equipment may be connected in the flow line from the well at any other point, as desired.

The flow section or unit 10 constitutes the first or inner fluid handling element and, as illustrated, may be directly attached to the well head 15. In the particular embodiment of the invention illustrated the inner or lower end of the unit 10 is provided with a flange 16 secured to the well head 15 by bolts or screws 17. The fluid handling section or unit 10 extends outwardly or upwardly from the head 15 and is formed with an external shoulder 18 spaced from the head. The flow sections or units 10 to 14 are elongate tubular members telescoped or nested one within the other in spaced substantially concentric relation to provide a tortuous passage of gradually increasing fluid capacity, as will be more fully described. In this telescoped or nested assembly of tubular elements the unit 10 constitutes the innermost part and the unit 14 the outermost part, and the invention provides means for holding the several flow sections or units in the nested relation. This means includes a plate or ring 19 arranged around the inner unit 10 to bear on its shoulder 18. The ring 19 may be fixed and sealed to the unit 10 as by welding. The sections or units 12 and 14 have their inner or lower ends secured to the ring 19. In practice the ends of the sections 12 and 14 may be received in annular grooves 20 in the ring 19 and welded or otherwise fixed to the ring.

The means for holding the units 10 to 14 in the nested or telescoped relation further includes a plate 21 applied to the upper or outer ends of the units 11 and 13. The plate 21 is a disc-like imperforate member forming a partition or closure at the outer ends of the units 11 and 13. A central recessed or socketed boss 22 may be formed on the under side of the plate 21 to fit in the end portion of the unit 11 and the outer end portion of the unit 13 may be received and fixed in an annular groove 23 in the periphery of the plate 21. A tubular adapter or carrier 24 supports the flow sections or units 11 and 13 and couples the apparatus with the pipe 16. The carrier 24 may be a length of pipe or the like and is arranged to engage or telescope over the unit 14. In the preferred construction, where provision is made for the regulation or adjustment of the pressure reducing action of the apparatus, the carrier 24 is shiftable on the outer flow unit 14. A suitable packing gland 25 is provided on the carrier 24 to slidably seal with the outer flow unit 14 to prevent the leakage of the fluid under pressure from the lower end of the carrier. The upper or outer portion of the carrier 24 shiftably enters the pipe 16. A packing gland 26 is provided on the pipe 16 to seal about the carrier 24. Circumferentially spaced spokes or webs 37 extend between and connect the flow unit 13 and the carrier 24 whereby the carrier supports the units 11 and 13 and the plate 21.

The invention provides means for shifting or adjusting the carrier 24 to vary or change the disposition of the flow units 11 and 13 relative to the flow units 10, 12 and 14, to regulate the pressure-reducing action of the apparatus and thereby control the flow from the well. Aligned lugs 27 and 28 are provided on the carrier 24 and the pipe 16, respectively. The lug 27 may be a projecting part of a collar 29 welded or otherwise fixed to the carrier 24 and the lug 28 may extend from a bell or enlargement on the pipe 16. The lug 27 is formed with a longitudinal or vertical opening 30 and the lug 28 has a somewhat smaller opening 31 aligned with the opening 30. An adjusting screw 32 is threaded in the opening 30 and is provided with a reduced unthreaded portion 33 which is rotatable in the opening 31. A shoulder 34 and a collar 35 on the screw 32 cooperate with the upper and lower sides of the lug 28 to hold the screw against longitudinal movement. The projecting upper portion 36 of the screw 32 is formed for engagement by a turning tool such as a wrench, for example, it may be polygonal, as illustrated. Rotation of the screw 32 adjusts or moves the flow sections 11 and 13 vertically or longitudinally with respect to the fixed flow units 10, 12 and 14.

With the apparatus of the invention installed as above described, the passage or opening 38 extending through the innermost flow unit 10 forms a fluid duct leading from the interior of the flow pipe or well head 15. The passage 38 in the unit 10 may be considerably smaller in diameter than the head 15, or the fluid conductor delivering the fluid from the well, to provide for an initial fluid friction action with a proportionate reduction in the pressure. This relation of the passage or opening 38 to the fluid source or well head 15 is not essential though probably desirable in most installations. The passage or opening 38 in the unit 10 extends outwardly or upwardly to a chamber or space 39 defined by the outer portion of the unit 10 and the plate 21.

As mentioned above, the plurality of flow units 10 to 14 are in spaced relation to leave or provide for an elongate continuous duct or passage for controlling the pressure of the flowing well fluid. This duct or passage extends from the chamber or space 39 to the interior of the carrier 24 and is of peculiar or special formation. In accordance with the invention the relationship or spacing of the flow units 10, 11, 12, 13 and 14 is such that the pressure controlling duct or passage gradually increases in fluid capacity to control the fluid flow in accordance with the method of the invention.

The flow unit 11 telescoping over or partially surrounding the unit 10 is spaced from the exterior of the unit 10 to leave an annular space or passage A of restricted cross-sectional area or fluid capacity. The outer end of this reduced passage A is in communication with the chamber or space 39 to receive the fluid under pressure issuing from the opening 38. The inner or lower end of the flow unit 11 is spaced from the ring 19 leaving an annular chamber or space 40 and the lower end of the passage A joins this space. The cross-sectional area or fluid capacity of the passage A is much less than that of the passage or opening 38 and in a typical embodiment of the invention the passage A is of substantial length. The greatly restricted elongate passage A operates to markedly reduce the pressure of the fluid passing through it.

The flow unit 12 extending outwardly or upwardly from the ring 19 is arranged to have its interior surface spaced from the external surface of the flow unit 11 to provide or leave an annular fluid passage B. The upper or outer end of the unit 12 is spaced from the plate 21 so that an annular chamber or space 41, defined by the sections 11 and 13 and the plate 21, is left at the outer end of the passage B. The above-mentioned chamber or space 40 at the inner end of the unit 11 connects the inner end of the passage B with the inner end of the passage A so that the fluid leaving the passage A almost immediately enters the passage B to pass outwardly therethrough to the space 41. In accordance with the invention the second flow-controlling passage B is larger in cross-sectional area or fluid capacity than the first passage A. The differential in capacity or size of the passages A and B may vary in different installations. Although the passage B is somewhat larger in fluid capacity than the passage A it is still quite restricted or limited in fluid capacity to control the pressure and flow. The passage B is an elongate restricted opening or duct that produces a marked reduction in the pressure on the fluid passing through it. Thus the passage B provides for a continued substantial reduction in the pressure of the fluid while maintaining a substantially constant fluid flow rate.

The flow unit 13 projecting inwardly or downwardly from the plate 21 is proportioned and arranged to telescope over the unit 12 with clearance providing or leaving a fluid passage C. The passage C extends inwardly or downwardly from the space 41 to the lower end of the unit 13. The lower end of the unit 13 is spaced from the ring 19 to leave an annular chamber or space 42 which is defined by the units 12 and 14 and the ring 19. The passage C serves to conduct the fluid from the space 41 to the space 42. In accordance with the invention the passage C is larger in cross sectional area or fluid capacity than the passage B, the difference in fluid capacity of the passages B and C varying with different installations. Although the passage C is larger in fluid capacity than the passage B it is still quite limited in cross sectional area to provide for a sustained control of the fluid pressure. The fluid under pressure issuing from the passage B immediately enters the passage C for flow therethrough to the space 42. The restricted elongate passage C assures a further or continued reduction in the pressure of the fluid while maintaining substantially the same flow rate. Accordingly, the fluid at the space 42 is at a lower pressure than at the space 41 but is flowing at about the same rate.

The outer flow section or unit 14 which extends outwardly or upwardly from the ring 19 telescopes over the unit 13 with clearance providing or leaving an annular space or passage D. The passage D extends outwardly from the space 42 to the interior of the carrier 24 and forms the outer portion of the flow controlling duct of the invention. The passage D is somewhat larger in cross sectional area or fluid capacity than the passage C. However, as illustrated, the passage D is of limited fluid capacity so that the fluid passing through this long duct of limited area is controlled and its pressure is reduced while its volume is maintained. It will be seen that the pressure on the fluid issuing from the outer end of the passage D is considerably less than the pressure at the lower end of the passage and it will be apparent that the rate of flow is maintained.

The passages A—B—C—D constitute a long, continuous restricted flow and pressure controlling canal, conduit or duct which gradually increases in volume or fluid capacity from its intake end to its outlet end. This long restricted gradually enlarging duct A—B—C—D operates to gradually decrease the pressure of the fluid while maintaining a substantially constant rate of flow. The control duct A—B—C—D reduces the fluid pressure to such an extent that it is operable to bring a very high dangerous pressure down to a point where the fluid may be safely and readily handled by standard piping, etc. The control duct A—B—C—D of the invention serves to reduce the fluid pressure as required without emulsifying the oil and the water particles suspended therein and without causing a sudden pressure drop with the accompanying temperature drop which often occurs in other flow controlling device.

The assembly of the units 10 to 14, inclusive, providing or defining the long, restricted, gradually increasing duct A—B—C—D constitutes an efficient fluid pressure and volume controller. This pressure controller is regulated by means of the screw 32 and is, in effect, an adjustable pressure and volume regulator. When the screw 32 is threaded to move the carrier 24 and the units 11 and 13 outwardly or upwardly the effective lengths of the passages A—B—C—D are reduced so that the control duct reduces the pressure to a less degree. When the screw 32 is operated to shift the carrier 24 and the sections 11 and 13 inwardly or downwardly the lengths of the restricted effective portions of the passages A—B—C—D are increased so that the control duct reduces the fluid pressure to a greater extent.

Pressure indicating means may be associated with the flow controller or regulator to indicate the pressure conditions in various parts of the apparatus. Pressure gauges 44 may be mounted on the units 10 and 14 and on the carrier 24 to indicate the pressures in the spaces 40, 42 and 41, respectively. A port 45 may be formed in the shouldered portion of the unit 10 to maintain the gauge of that unit in communication with the space 40. The gauge 44 for the space 42 may have its pipe or fitting arranged in an opening or port 46 in the wall of the unit 14 to directly communicate with the space 42. The gauge 44 for the space 41 may have its pipe or fitting communicating with a port 47 which passes through the wall of the carrier 24, one of the webs 37 and the wall of the unit 13 to the space 42. If desired a pressure gauge 48 may be provided on the well head 15 to indicate the initial fluid pressure and a pressure gauge 49 may be provided on the carrier 24 to indicate the final pressure in the carrier and pipe 16. When adjusting the flow controlling apparatus by means of the screw 32 the gauges 44, 48 and 49 may be consulted to facilitate the desired setting or regulation of the apparatus.

Figs. 3 and 4 of the drawings illustrate an apparatus of the invention in which a plurality of flow controlling sections or units 10ª, 11ª, 12ª, 13ª and 14ª are assembled to form a continuous elongate assembly or flow regulator. In the construction and application illustrated there are four flow sections or units 10ª to 14ª interposed between the well head 15 and the pipe 16 for conducting the fluid from the well. The flow sections or units 10ª to 14ª may be straight, elongate tubular members or pipes. The units 10ª to 14ª may each be of substantial length, for example, each unit may be several feet long, it being understood that the length and fluid capacities of the flow units may vary with different installations. The units 10ª to 14ª are gradually increased in size or fluid capacity from one end of the assembly or series to the other, the unit 10ª forming the element of smallest fluid capacity at the inlet end of the series and the unit 14ª forming the element of largest fluid capacity at the outlet end of the series. In most installations the cross sectional area or fluid capacity of the unit 10ª is much less than that of the well head 15 or the pipe conducting fluid to the unit, and the largest unit 14ª is likewise considerably smaller in fluid capacity than the head 15.

The adjacent ends of the flow units 10ª to 14ª are connected for the passage of the fluid. In the typical arrangement illustrated the sections 10ª to 14ª are arranged in longitutdinal alignment with their adjacent end parts in telescoping relation. The unit 10ª has its upper end portion received in the lower end of the unit 11ª, the upper portion of the unit 11ª is received in the lower portion of the unit 12ª, the upper part of the unit 12ª is received in the lower portion of the unit 13ª, and the upper part of the unit 13ª is received in the lower end of the uppermost unit 14ª. Where the apparatus is to be regulable or adjustable the adjacent sections or units slidably or shiftably fit one in the other and packing glands 55 are provided to seal between the slidably fitted parts. While I have shown the assembly of units 11ª to 14ª extending straight from the well head 15 it is to be understood that the structure or assembly may be disposed in other manners, for example, it may be arranged to extend at an angle from the head, in which case a suitable fitting is employed to connect the inner end of the unit 11ª with the well head 15.

The flow units 10ª to 14ª interposed between the well head 15 and the pipe 16, as above described, constitute a long, continuous restricted duct or fluid conductor that is tapered or of gradually increasing cross-sectional area from its inner end to its outer end. As in the previously described form of the invention, the pressure of the well fluid is gradually and substantially uniformly reduced as the fluid passes through the long, restricted, gradually increasing duct or conduit, the flow being controlled throughout the length of the assembly. The rate of fluid flow through the sections 10ª to 14ª is maintained substantially constant by reason of the gradually increased fluid capacity of the assembly. The fluid passing through the units 10ª to 14ª is not subjected to a sudden change in velocity, direction or temperature, and is not emulsified or subjected to undesirable low temperatures. Suitable pressure gauges 56 are connected in the sections or units 10ª to 14ª to indicate the pressures in the various parts of the assembly. A gauge 56 may be provided intermediate the ends of each unit 10ª to 14ª.

The total length of the flow controlling assembly 10ª to 14ª may be varied to change or regulate the pressure reducing action of the apparatus. The pipe 16 may be moved relative to the well head 15 to vary the length of the restricted flow controlling assembly 10ª to 14ª. The variation in length of the assembly may be substantially equally distributed throughout the length of the assembly to evenly vary the pressure reducing action of the assembly throughout the length of the apparatus. On the other hand, if desired, the adjustment or regulation may be confined to one unit by shifting such unit relative to the other units, or may be confined to a selected number of units to vary the pressure reducing action at given sections of the apparatus. It will be seen that a reduction in the length of the assembly 10ª to 14ª, whether it be distributed or not, lessens the pressure reducing action of the apparatus while an elongation of the assembly increases the pressure reducing action. The regulation obtained by contraction or elongation of the assembly 10ª to 14ª may be determined by consulting the gauges 56.

Fig. 5 of the drawings illustrates a form of apparatus of the invention embodying a plurality of flow sections or units 10ᵇ, 11ᵇ, 12ᵇ, 13ᵇ and 14ᵇ, forming a gradually enlarging elongate pressure and volume controlling conduit and this form of the invention is characterized by controllable by-passes connected between spaced parts of the assembly to vary the pressure reducing action of the apparatus.

The flow controlling sections or units 10ᵇ to 14ᵇ form a conduit or fluid conductor to be interposed between the well head 15 and the pipe 16. While the sections 10ᵇ to 14ᵇ may be disposed and related in various manners I have shown them in spaced, generally parallel relation. It is to be understood that the invention is not to be considered as restricted to this particular arrangement or disposition of the flow units 10ᵇ to 14ᵇ. The units 10ᵇ to 14ᵇ are varied or graduated in fluid capacity to constitute a long, fluid conduit of gradually increasing capacity. The unit 10ᵇ constitutes the inlet element of the assembly and is the smallest or most restricted in fluid handling capacity and the unit 14ᵇ is the outlet or discharge element of the assembly and has the largest fluid capacity. The sections or units 10ᵇ to 14ᵇ may be increased in fluid capacity in a regular progression or in an irregular progression, as desired. Assuming that the units 10ᵇ and 14ᵇ are positioned vertically the upper end of the unit 10ᵇ is connected with the upper end of the unit 11ᵇ by a connecting pipe 60 extending between elbows or fittings 61 on the ends of said units. The pipe 60 may be quite short and may be of the same diameter as the unit 10ᵇ or may be of the same diameter as the unit 11ᵇ. The lower end of the second unit 11ᵇ is connected with the lower end of the third unit 12ᵇ by a connecting pipe 62 carried by fittings 63 on the ends of said units. I have shown the pipe 62 of the same diameter as the unit 12ᵇ, it being apparent that it may be of the same fluid capacity as the unit 11ᵇ. The upper ends of the units 12ᵇ and 13ᵇ are connected in fluid transferring relation by a pipe 64 extending between suitable fittings 65 on the ends of said units. The pipe 64 is of suitable diameter, for example, it may be of the same diameter as either of the adjacent units. The lower end of the unit 13ᵇ is connected with the lower end of the unit 14ᵇ by a connecting pipe 66 extending between suitable fittings 67 on the ends of the units. The pipe 66 may be of the same diameter as the unit 14ᵇ. A suitable reducer or adapter 68 may serve to connect the outer or upper end of the unit 14ᵇ with the pipe 16. It will be seen that the units 10ᵇ to 14ᵇ assembled as just described form a long, continuous pressure controlling pipe which tapers or gradually increases in fluid capacity to gradually and uniformly reduce the pressure on the fluid passing therethrough while maintaining a substantially constant rate of fluid flow.

The regulating means or adjusting means in the apparatus illustrated in Fig. 5 is in the form of valve controlled by-passes for cutting in and cutting out certain parts of the tapered or gradually enlarging fluid conduit 10ᵇ to 14ᵇ. The regulating means may comprise one or more by-passes connected between selected flow units 10ᵇ to 14ᵇ. In the case illustrated there are two by-passes 69 and 70. The by-pass 69 is arranged to cut off or by-pass fluid past the units 12ᵇ and 13ᵇ while the by-pass 70 is arranged to by-pass fluid around portions of the units 12ᵇ and 13ᵇ. The by-pass 69 may be in the form of a pipe or fluid conductor connected between the fittings 63 and 67 on the lower ends of the units 12ᵇ and 13ᵇ. The by-pass 69 is proportioned to adequately handle the fluid flow. A valve 71 is connected in the by-pass 69. When the valve 71 is closed the fluid is obliged to pass through the units 12ᵇ and 13ᵇ. When the valve 71 is open the fluid may pass directly from the pipe 62 to the pipe 66 and thus flows from the unit 11ᵇ to the unit 14ᵇ without passing through the units 12ᵇ and 13ᵇ. The by-pass 70 may be a suitable pipe or conduit whose ends are connected in fittings 72 in the units 12ᵇ and 13ᵇ. The fittings 72 may be connected in the units 12ᵇ and 13ᵇ at any selected points so that the by-pass 70 is operable to cut out selected portions of the units. The by-pass 70 is equipped with a valve 73. Assuming that both valves 71 and 73 are closed the fluid is obliged to flow completely through both units 12ᵇ and 13ᵇ. With the valve 71 closed and the valve 73 open the fluid by-passes the upper or outer portions of the units 12ᵇ and 13ᵇ.

Suitable pressure gauges 74 are connected in the units 10ᵇ to 14ᵇ or in the fittings associated with the units. In the case illustrated there is a pressure gauge 74 connected in the fitting at the outer or down-stream end of each unit 10ᵇ to 14ᵇ. The gauge 74 at the down-stream end of the unit 14ᵇ may be connected in the adapter 68. A pressure gauge 75 may be provided on the well head 15. It will be seen that the valves 71 and 73 may be utilized to vary the effective length of the tapering or gradually increasing fluid conductor to regulate the pressure reducing action of the same. The pressures in the various parts of the apparatus and the results of the said regulation may be ascertained by consulting the pressure gauges 74.

In each form of the invention the size or fluid capacity of the passage gradually increases substantially in proportion to the increase in fluid volume, which results from the gradual reduction in pressure, thus providing for a substantially uniform fluid flow rate throughout.

Having described only typical preferred forms and applications of my invention, I do not wish to be limited or restricted to the specific details herein set forth, but wish to reserve to myself any variations or modifications that may appear to those skilled in the art, or fall within the scope of the following claims.

Having described my invention, I claim:

1. Apparatus for controlling the flow of a fluid which increases in volume when subjected to a pressure drop, comprising an unobstructed conduit connected to a well or other source of fluid under pressure, the fluid carrying capacity of the conduit being so proportioned to the pressure head and the viscosity of the fluid as to permit fluid at a predetermined gravimetric rate to pass through the conduit at a predetermined approximately uniform velocity, the cross sectional area of the conduit increasing in the direction of flow to accommodate the increasing volume of the fluid whereby the predetermined velocity is maintained approximately uniform throughout the conduit.

2. Apparatus for controlling the flow of a fluid which increases in volume when subjected to a pressure drop, comprising an unobstructed conduit connected to a well or other source of fluid under pressure, the cross sectional area of said conduit increasing in the direction of flow to accommodate the increasing volume of the fluid, said conduit being so proportioned to the pressure head, the viscosity of the fluid and the changing volume of the fluid as to cause fluid at a predetermined gravimetric rate to pass through the conduit at a predetermined approximately uniform velocity throughout the length of the conduit whereby the volume of fluid discharged at the outflow end of the conduit and the pressure of the fluid thereat are controlled.

3. Apparatus for controlling the flow of a fluid which increases in volume when subjected to a pressure drop, comprising two or more tubular units assembled to form an unobstructed conduit connected to a well or other source of fluid under pressure, the fluid carrying capacity of the conduit being so proportioned to the pressure head and the viscosity of the fluid as to permit fluid at a predetermined gravimetric rate to pass through the conduit at a predetermined approximately uniform velocity, the cross sectional area of the second and each subsequent unit in the direction of flow being sufficiently greater than the cross sectional area of the preceding unit to accommodate the increasing volume of the fluid whereby the predetermined velocity is maintained approximately uniform throughout the length of the conduit.

4. Apparatus for controlling the flow of a fluid which increases in volume when subjected to a pressure drop, comprising an unobstructed conduit connected to a well or other source of fluid under pressure, said conduit being composed of two or more connected tubular units, the cross sectional area of the second and each subsequent unit in the direction of flow being greater than the cross sectional area of the preceding unit to accommodate the changing volume of the fluid, said conduit being so proportioned to the pressure head, the viscosity of the fluid and the changing volume of the fluid as to permit fluid at a predetermined gravimetric rate to pass through the conduit at a predetermined approximately uniform velocity whereby the volume of fluid discharged at the outflow end of the conduit and the pressure of the fluid thereat are controlled.

5. Apparatus for controlling the flow of a fluid which increases in volume when subjected to a pressure drop, comprising an unobstructed conduit connected to a well or other source of fluid under pressure, said conduit consisting of connected sections, the cross sectional area of each trailing section being larger than the cross sectional area of the preceding section to accommodate the changing volume of fluid, each section being so proportioned to the pressure head, the viscosity of the fluid and the changing volume of the fluid as to permit fluid at a predetermined gravimetric rate to pass through all of the sections at a predetermined approximately uniform velocity whereby the volume of fluid discharged at the effluent end of the conduit and the pressure of the fluid thereat are controlled.

6. Apparatus for controlling the flow of a fluid which increases in volume when subjected to a pressure drop, comprising an unobstructed conduit connected to a well or other source of fluid under pressure, said conduit being composed of two or more connected tubular units, the cross sectional area of the second and each subsequent unit in the direction of flow being greater than the cross sectional area of the preceding unit to accommodate the changing volume of the fluid, said conduit being so proportioned to the pressure head, the viscosity of the fluid and the changing volume of the fluid as to permit fluid at a predetermined gravimetric rate to pass through the conduit at a predetermined approximately uniform velocity whereby the volume of fluid discharged at the outflow end of the conduit and the pressure of the fluid thereat are controlled, at least one of the tubular units being telescopically arranged in another tubular unit and movable with respect thereto to vary the effective length of the conduit.

7. Apparatus for controlling the flow of a fluid which increases in volume when subjected to a pressure drop, comprising an unobstructed conduit connected to a well or other source of fluid under pressure, said conduit being composed of two or more connected tubular units, the cross sectional area of the second and each subsequent unit in the direction of flow being greater than the cross sectional area of the preceding unit to accommodate the changing volume of the fluid, said conduit being so proportioned to the pressure head, the viscosity of the fluid and the changing volume of the fluid as to permit fluid at a predetermined gravimetric rate to pass through the conduit at a predetermined approximately uniform velocity whereby the volume of fluid discharged at the outflow end of the conduit and the pressure of the fluid thereat are controlled, at least one of the tubular units being telescopically arranged in another tubular unit and movable with respect thereto to vary the effective length of the conduit, and means for controlling the movement of the movable member of the telescopic unit.

8. Apparatus for controlling the flow of a fluid which increases in volume when subjected to a pressure drop, comprising an unobstructed conduit connected to a well or other source of fluid under pressure, said conduit consisting of connected sections, the cross sectional area of each trailing section being larger than the cross sectional area of the preceding section to accommodate the changing volume of fluid, each section being so proportioned to the pressure head, the viscosity of the fluid and the changing volume of the fluid as to permit fluid at a predetermined gravimetric rate to pass through all of the sections at a predetermined approximately uniform velocity whereby the volume of fluid discharged at the effluent end of the conduit and the pressure of the fluid thereat are controlled, and valved means for by-passing the fluid from one of said sections to another around at least one section whereby the effective length of the conduit may be decreased.

9. Apparatus for controlling the flow of a fluid which increases in volume when subjected to a pressure drop, comprising tubular flow units positioned one within the other in spaced relation so that the space between adjacent units forms an unobstructed fluid passage which increases in cross sectional area to accommodate the changing volume of fluid and is so proportioned to the pressure head, the viscosity of the fluid and the changing volume of the fluid as to permit fluid at a predetermined gravimetric rate to pass through the passage at a predetermined approximately uniform velocity whereby the volume of fluid discharged at the effluent end of the apparatus and the pressure of the fluid thereat are controlled, means for connecting the passage to a well or other source of fluid under pressure, means for supporting one unit for axial movement with respect to the other unit and means for moving the movable unit to vary the effective length of the passage.

10. Apparatus for controlling the flow of a fluid which increases in volume when subjected to a pressure drop, comprising a group of tubular units arranged one within the other in spaced relation, a second group of tubular units arranged one within the other in spaced relation, said groups being so nested that the units of the two groups surround one another in spaced relation to form a continuous unobstructed duct so proportioned to the pressure head, the viscosity of the fluid and the changing volume of the fluid as to permit fluid at a predetermined gravimetric rate to flow through the duct at a predetermined approximately uniform velocity whereby the volume of the fluid discharged at the outflow end of the duct and the pressure of the fluid thereat are controlled, means for connecting the duct to a well or other source of fluid under pressure, and means for shifting one of said groups with respect to the other to change the effective length of the duct.

ROY M. RHOADS.